US012671488B2

(12) United States Patent
Turtinen et al.

(10) Patent No.: US 12,671,488 B2
(45) Date of Patent: Jun. 30, 2026

(54) MECHANISM FOR BEAM FAILURE DETECTION

(71) Applicant: Nokia Technologies Oy, Espoo (FI)

(72) Inventors: Samuli Heikki Turtinen, Oulu (FI); Timo Koskela, Oulu (FI); Jussi-Pekka Koskinen, Oulu (FI); Chunli Wu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 310 days.

(21) Appl. No.: 18/560,582

(22) PCT Filed: May 19, 2021

(86) PCT No.: PCT/CN2021/094650
§ 371 (c)(1),
(2) Date: Nov. 13, 2023

(87) PCT Pub. No.: WO2022/241673
PCT Pub. Date: Nov. 24, 2022

(65) Prior Publication Data
US 2024/0259076 A1 Aug. 1, 2024

(51) Int. Cl.
*H04B 7/06* (2006.01)

(52) U.S. Cl.
CPC ................................ *H04B 7/06964* (2023.05)

(58) Field of Classification Search
CPC .. H04B 7/0695; H04B 7/06964; H04B 7/088; H04W 24/08
See application file for complete search history.

(56) References Cited

U.S. PATENT DOCUMENTS

| | | | | |
|---|---|---|---|---|
| 2019/0281480 A1* | 9/2019 | Wei | ........................ | H04W 76/19 |
| 2019/0305840 A1* | 10/2019 | Cirik | ..................... | H04W 76/19 |
| 2019/0306842 A1* | 10/2019 | Cirik | .................. | H04B 7/06964 |
| 2019/0357291 A1* | 11/2019 | Zhou | ..................... | H04W 76/19 |
| 2020/0052769 A1* | 2/2020 | Cirik | ................. | H04B 7/06964 |
| 2020/0100154 A1* | 3/2020 | Cirik | ................. | H04B 7/06964 |

(Continued)

FOREIGN PATENT DOCUMENTS

| | | |
|---|---|---|
| CN | 110324119 A | 10/2019 |
| CN | 112136295 A | 12/2020 |

(Continued)

OTHER PUBLICATIONS

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

(Continued)

*Primary Examiner* — Benjamin H Elliott, IV
(74) *Attorney, Agent, or Firm* — McCarter & English, LLP

(57) ABSTRACT

Embodiments of the present disclosure relates to beam failure detection. According to embodiments of the present disclosure, after a serving cell is activated from a deactivated state, a terminal device monitors a beam failure on a serving beam of the serving cell. If a beam failure instance indication is received within a short period after the activation, the terminal device determines that the beam failure is detected on the serving beam. In this way, a beam failure recovery can be quicker triggered to perform candidate beam search.

20 Claims, 4 Drawing Sheets

(56) References Cited

U.S. PATENT DOCUMENTS

| | | | | | |
|---|---|---|---|---|---|
| 2020/0145280 A1* | 5/2020 | Cirik | | | H04B 7/088 |
| 2020/0373993 A1* | 11/2020 | Wu | | | H04B 7/06964 |
| 2020/0374960 A1* | 11/2020 | Deenoo | | | H04B 7/088 |
| 2020/0383167 A1* | 12/2020 | Sengupta | | | H04B 7/06964 |
| 2021/0013951 A1* | 1/2021 | Chen | | | H04W 76/15 |
| 2021/0037589 A1* | 2/2021 | Yoshioka | | | H04W 76/18 |
| 2021/0051754 A1* | 2/2021 | Zhou | | | H04B 7/088 |
| 2021/0058134 A1* | 2/2021 | Luo | | | H04B 7/06964 |
| 2021/0105058 A1* | 4/2021 | Lin | | | H04W 72/1263 |
| 2021/0218458 A1* | 7/2021 | Kung | | | H04W 80/02 |
| 2023/0007554 A1* | 1/2023 | Turtinen | | | H04L 1/1864 |
| 2024/0259076 A1* | 8/2024 | Turtinen | | | H04B 7/06964 |

FOREIGN PATENT DOCUMENTS

| | | |
|---|---|---|
| CN | 112789811 A | 5/2021 |
| WO | 2019/119399 A1 | 6/2019 |
| WO | 2019/141379 A1 | 7/2019 |
| WO | 2019/141398 A1 | 7/2019 |
| WO | 2021/067236 A1 | 4/2021 |

OTHER PUBLICATIONS

"Revised WID on Further Multi-RAT Dual-Connectivity enhancements", 3GPP TSG RAN Meeting #88e, RP-201040, Agenda: 9.10.9, Huawei, Jun. 29-Jul. 3, 2020, 4 pages.

"Considerations on RLM during SCG deactivation", 3GPP TSG-RAN WG2 Meeting #113-bis-e, R2-2102749, Agenda: 8.2.2.2, KDDI Corporation, Apr. 12-20, 2021, pp. 1-2.

"UE behavior when SCG is deactivated", 3GPP TSG-RAN WG2 Meeting #113-bis-e, R2-2102872, Agenda: 8.2.2.2, vivo, Apr. 12-20, 2021, 9 pages.

"UE measurements and reporting in deactivated SCG", 3GPP TSG-RAN WG2 Meeting #113-bis-e, R2-2102897, Agenda: 8.2.2.2, OPPO, Apr. 12-20, 2021, pp. 1-8.

"UE Behavior in Deactivated SCG", 3GPP TSG-RAN WG2 Meeting #113-bis-e, R2-2103107, Agenda: 8.2.2.2, CATT, Apr. 12-20, 2021, 3 pages.

"UE behaviour in deactivated SCG", 3GPP TSG-RAN WG2 Meeting #113-bis-e, R2-2103398, Agenda: 8.2.2.2, Lenovo, Apr. 12-20, 2021, 3 pages.

"UE Measurement Aspects in SCG Deactivation", 3GPP TSG-RAN WG2 Meeting #113-bis-e, R2-2103569, Agenda: 8.2.2.2, LG Electronics Inc, Apr. 12-20, 2021, pp. 1-4.

"Measurements and maintenance of UL synch with a deactivated SCG", 3GPP TSG-RAN WG2 Meeting #113-bis-e, R2-2103682, Agenda: 8.2.2.2, InterDigital Inc, Apr. 12-20, 2021, pp. 1-5.

"UE measurements and reporting in deactivated SCG", 3GPP TSG-RAN WG2 #113bis-e, R2-2103808, Agenda: 8.2.2.2, Ericsson, Apr. 12-20, 2021, 10 pages.

"TA Maintenance and other UE actions in SCG deactivated state", 3GPP TSG-RAN WG2 #113bis-e, R2-2103885, Agenda: 8.2.2.2, Apple Inc, Apr. 12-20, 2021, pp. 1-5.

"UE measurements and reporting in deactivated SCG", 3GPP TSG-RAN WG2 Meeting #113-bis-e, R2-2103893, Agenda: 8.2.2. 2, Qualcomm Incorporated, Apr. 12-20, 2021, 9 pages.

"UE behaviour in deactivated SCG", 3GPP TSG-RAN WG2 Meeting #113-bis-e, R2-2103978, Agenda: 8.2.2.2, Huawei, Apr. 12-20, 2021, 6 pages.

"Discussion for UE behaviour in deactivated SCG", 3GPP TSG-RAN WG2 Meeting #113-bis-e, R2-2104124, Agenda: 8.2.2.2, Sharp, Apr. 12-20, 2021, pp. 1-6.

"UE behavior during SCG deactivation", 3GPP TSG-RAN WG2 Meeting #113-bis-e, R2-2104160, Agenda: 8.2.2.2, MediaTek Inc, Apr. 12-20, 2021, 3 pages.

"Acrivation and Deactivation on SCG", 3GPP TSG-RAN WG2 Meeting #113-bis-e, R2-2103570, Agenda: 8.2.2.3, LG Electronics Inc, Apr. 12-20, 2021, pp. 1-4.

"SCG activation procedures", 3GPP TSG-RAN WG2 Meeting #113-bis-e, R2-2103809, Agenda: 8.2.2.3, Ericsson, Apr. 12-20, 2021, pp. 1-9.

"Considerations on reactivating SCG", 3GPP TSG-RAN WG2 Meeting #113-bis-e, R2-2104231, Agenda: 8.2.2.3, Intel Corporation, Apr. 12-20, 2021, pp. 1-4.

"Access handling with TAT in SCG fast activation", 3GPP TSG-RAN WG2 Meeting #113-bis-e, R2-2103153, Agenda: 8.2.2.1, Futurewei, Apr. 12-20, 2021, 3 pages.

"[AT113-e][230][eDCCA] Solution alternatives for SCG activation and deactivation", 3GPP TSG-RAN WG2#113-e, R2-210xxxx, Agenda:8.2.2, Huawei, Jan. 25-Feb. 5, 2021, 28 pages.

"Discussion on SCell BFR regarding RS change", 3GPP TSG-RAN WG2 Meeting #113 bis electronic, R2-2103447, Agenda:6.1.3.1, ASUSTeK, Apr. 12-Apr. 20, 2021, 4 pages.

"IEEE 802.11", Wikipedia, Retrieved on Dec. 1, 2023, Webpage available at : https://en.wikipedia.org/wiki/IEEE_802.11.

International Search Report and Written Opinion received for corresponding Patent Cooperation Treaty Application No. PCT/CN2021/094650, dated Jan. 25, 2022, 9 pages.

"Updates to MAC spec for 2-step RACH", 3GPP TSG-RAN WG2 Meeting #110-e, R2-2006019, ZTE, Jun. 1-12, 2020, pp. 1-141.

"Miscellaneous corrections for IIOT MAC", 3GPP TSG-RAN2 Meeting #111-e, R2-2008055, Samsung, Aug. 17-28, 2020, 146 pages.

"Discussion on the beam management procedures for 52-71GHz band", 3GPP TSG RAN WG1 Meeting #104-e, R1-2100203, Agenda: 8.2.4, Huawei, Jan. 25-Feb. 5, 2021, 6 pages.

"3rd Generation Partnership Project, Technical Specification Group Radio Access Network; NR; Medium Access Control (MAC) protocol specification (Release 17)", 3GPP TS 38.321, V17.5.0, Jun. 2023, pp. 1-253.

Office action received for corresponding Chinese Patent Application No. 202180005449.5, dated Jun. 28, 2025, 9 pages of office action and 7 pages of translation available.

* cited by examiner

200

110-1

Device

120

Device

TRANSMIT A CONFIGURATION
2005

2010    DEACTIVATE A SERVING BEAM

2015    PERFORM AN ACTIVATION
        PROCEDURE

2020    MONITOR A BEAM FAILURE

2025    START A FIRST TIMER

2030    DETERMINE THAT A BEAM
        FAILURE IS DETECTED

TRANSMIT A BEAM FAILURE
        REPORT
        2035

2040    PERFORM A BEAM RECOVERY
        FAILURE

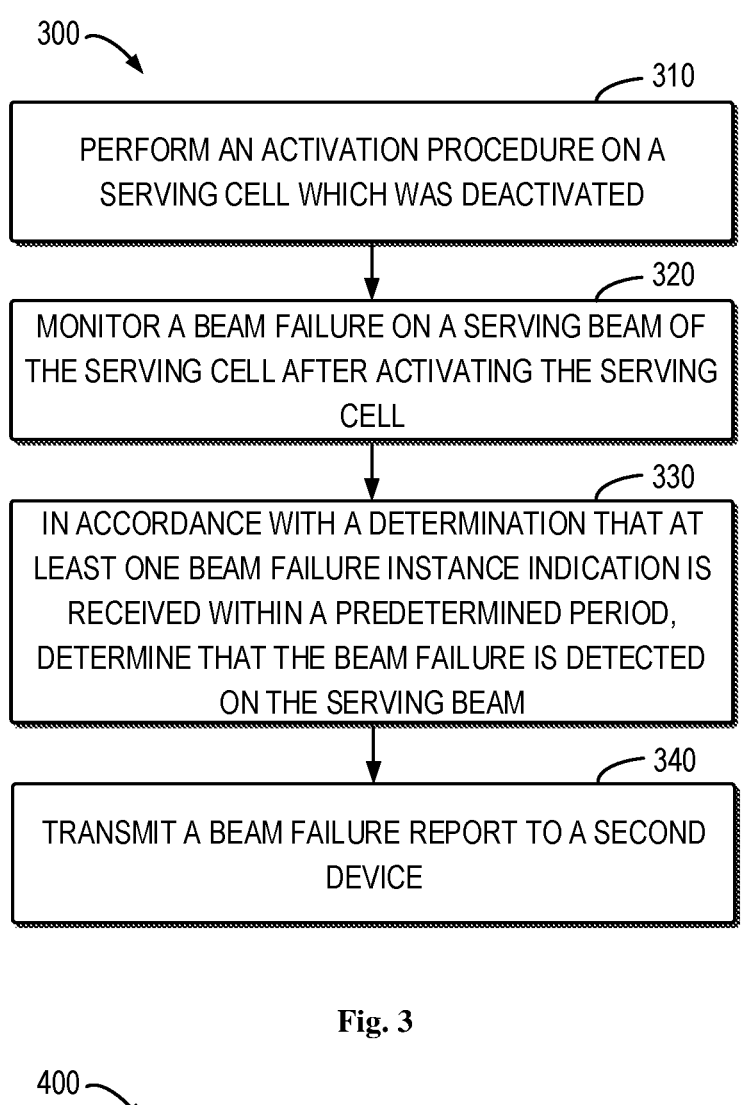

300

310

PERFORM AN ACTIVATION PROCEDURE ON A SERVING CELL WHICH WAS DEACTIVATED

320

MONITOR A BEAM FAILURE ON A SERVING BEAM OF THE SERVING CELL AFTER ACTIVATING THE SERVING CELL

330

IN ACCORDANCE WITH A DETERMINATION THAT AT LEAST ONE BEAM FAILURE INSTANCE INDICATION IS RECEIVED WITHIN A PREDETERMINED PERIOD, DETERMINE THAT THE BEAM FAILURE IS DETECTED ON THE SERVING BEAM

340

TRANSMIT A BEAM FAILURE REPORT TO A SECOND DEVICE

TRANSMIT A CONFIGURATION TO A FIRST DEVICE

420

IN ACCORDANCE WITH A DETERMINATION THAT AT LEAST ONE BEAM FAILURE INSTANCE INDICATION ON A SERVING BEAM OF A SERVING CELL IS RECEIVED AT A FIRST DEVICE WITHIN A PREDETERMINED PERIOD AFTER ACTIVATING THE SERVING CELL, RECEIVE A BEAM FAILURE REPORT FROM THE FIRST DEVICE

MECHANISM FOR BEAM FAILURE DETECTION

RELATED APPLICATION

This application claims priority to PCT Application No. PCT/CN2021/094650 filed May 19, 2021, which is incorporated herein by reference in its entirety.

FIELD

Embodiments of the present disclosure generally relate to the field of telecommunication and in particular, to methods, devices, apparatuses and computer readable storage medium for beam failure detection.

BACKGROUND

With development of communication technologies, several technologies have been proposed to increase system capacity. For example, a technology called "beamforming" has been proposed. Beamforming a particular processing for signals that allow for directional transmission or reception. If a beam failure occurs when there is a change of a surrounding environment, the terminal device can report this beam failure and request for a recovery of the beam.

SUMMARY

In general, example embodiments of the present disclosure provide a solution for beam failure detection.

In a first aspect, there is provided a first device. The first device comprises at least one processor; and at least one memory including computer program codes; the at least one memory and the computer program codes are configured to, with the at least one processor, cause the first device to: perform an activation procedure on a serving cell which was deactivated; monitor a beam failure on a serving beam of the serving cell after activating the serving cell; in accordance with a determination that at least one beam failure instance indication is received within a predetermined period, determine that the beam failure is detected on the serving beam; and transmit a beam failure report to a second device.

In a second aspect, there is provided a second device. The second device comprises at least one processor; and at least one memory including computer program codes; the at least one memory and the computer program codes are configured to, with the at least one processor, cause the second device to in accordance with a determination that at least one beam failure instance indication on a serving beam of a serving cell is received at device first device within a predetermined period after activating the serving cell, receive a beam failure report from the first device.

In a third aspect, there is provided a method. The method comprises performing, at a first device, an activation procedure on a serving cell which was deactivated; monitoring a beam failure on a serving beam of the serving cell after activating the serving cell; in accordance with a determination that at least one beam failure instance indication is received within a predetermined period, determining that the beam failure is detected on the serving beam; and transmitting a beam failure report to a second device.

In a fourth aspect, there is provided a method. The method comprises in accordance with a determination that at least one beam failure instance indication on a serving beam of a serving cell is received at device first device within a predetermined period after activating the serving cell, receiving, at a second device, a beam failure report from the first device.

In a fifth aspect, there is provided an apparatus. The apparatus comprise means for performing an activation procedure on a serving cell which was deactivated; means for monitoring a beam failure on a serving beam of the serving cell after activating the serving cell; means for in accordance with a determination that at least one beam failure instance indication is received within a predetermined period, determining that the beam failure is detected on the serving beam; and means for transmitting a beam failure report to a second device.

In a sixth aspect, there is provided an apparatus. The apparatus comprises means for in accordance with a determination that at least one beam failure instance indication on a serving beam of a serving cell is received at device first device within a predetermined period after activating the serving cell, receiving, at a second device, a beam failure report from the first device.

In a seventh aspect, there is provided a computer readable medium. The computer readable medium comprises program instructions for causing an apparatus to perform at least the method according to any one of the above third or fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 3 illustrates a flowchart of a method implemented at a first apparatus according to some example embodiments of the present disclosure;

FIG. 4 illustrates a flowchart of a method implemented at a second apparatus according to some other example embodiments of the present disclosure;

Throughout the drawings, the same or similar reference numerals represent the same or similar element.

DETAILED DESCRIPTION

Figure 1:
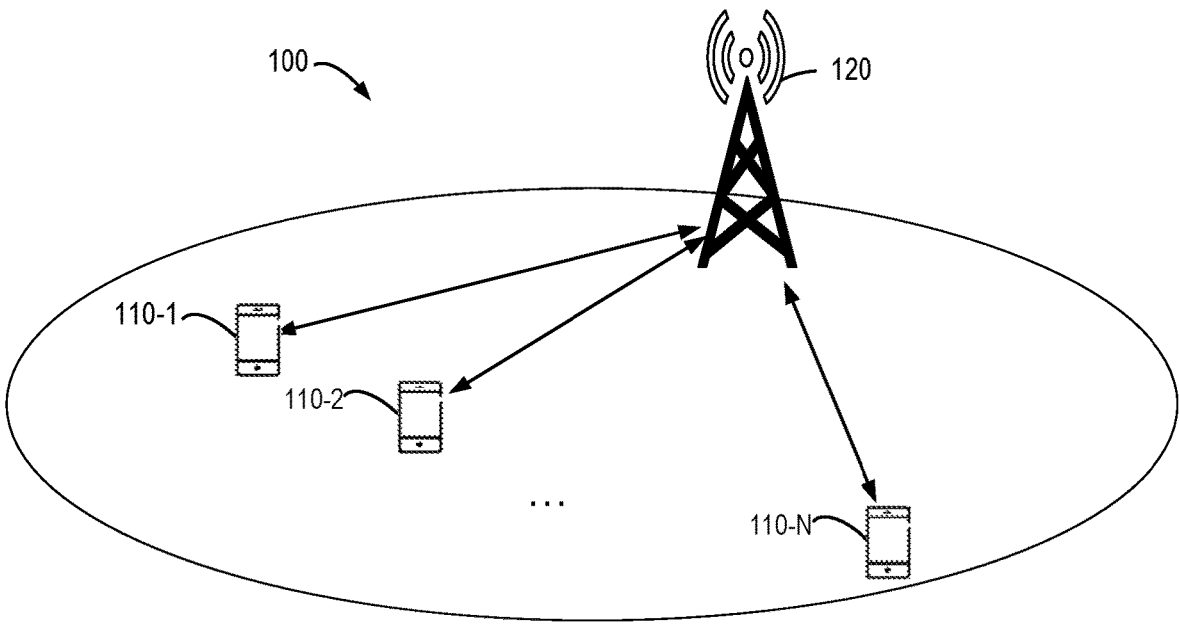
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated and Access Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. The term "terminal device" refers to any end device that may be capable of wireless communication. In the following description, the terms "terminal device", "terminal", "user equipment" and "UE" may be used interchangeably.

A terminal device configured with CA has at least a serving cell and it is referred to as a primary cell (PCell) or a primary secondary cell (PSCell) and/or other serving cells are called secondary cell (SCell). As mentioned above, if a beam failure occurs, the terminal device can report this beam failure and request for a recovery of the beam. The beam failure recover (BFR) for special cell (SpCell) is performed through a random access (RA) procedure. The BFR for SCell can use medium access control (MAC) control element (CE) based reporting. The term "SpCell" used herein can comprise a primary cell and a primary secondary cell.

According to conventional technologies, if a beam failure instance (BFI) indication has been received from lower layers, the MAC entity at a UE can start a beamFailureDetectionTimer and increase BFI_COUNTER by 1. If the BFI_COUNTER is no smaller than a beamFailureInstanceMaxCount and the serving cell is SCell, the UE can trigger a BFR for this serving cell. Alternatively, the UE can initiate a RA procedure on the SpCell. The beam failure detection (BFD) procedure can involve a timer represented as "beamFailureDetectionTimer" and a threshold parameter represented as "beamFailureInstanceMaxCount." The parameter "beamFailureDetectionTimer" used herein can refer to a timer for beam failure detection. The value of the beamFailureDetectionTimer can be in number of $Q_{out,LR}$ reporting periods of Beam Failure Detection reference signal. Value "pbfd1" corresponds to 1 $Q_{out,LR}$ reporting period of Beam Failure Detection Reference Signal, value "pbfd2" corresponds to 2 $Q_{out,LR}$ reporting periods of Beam Failure Detection Reference Signal. The parameter "beamFailure-InstanceMaxCount" can determine after how many beam failure events the UE triggers beam failure recovery. Value "n1" corresponds to 1 beam failure instance, value "n2" corresponds to 2 beam failure instances.

Moreover, activation/deactivation mechanisms for a SCG (including the PSCell and the SCell(s) within the SCG) and SCells have been proposed. Furthermore, there are proposals both in favor and against support of beam failure detection (BFD) while the SCG is deactivated. For radio link monitoring (RLM) support for SCG deactivation, there are some proposals to support RLM for deactivation SCG on PSCell due to SCG activation delay concern and legacy SCGFailureInformation message can be reused after RLM is detected. Some other proposals are not to support RLM because radio resource management (RRM) measurement results are sufficient to evaluate the PSCell coverage.

According to some conventional technologies, RLM can be supported after SCG deactivation and legacy SCGFailureInformation message and reporting procedure can be reused after RLM is detected. Some proposals can support BFD after SCG deactivation. If none of BFD, beam management, channel state information (CSI) is supported, UE always requires random access upon SCG activation which increases the activation delay even if the TA timer is running. BFD on top of already agreed RRM measurements for deactivated SCG is not expected to be very costly in terms of UE power consumption. Some proposals are not to support BFD after SCG deactivation due to UE power consumption concern and doubt the necessary of BFD due to no data activity. Some proposals also think that RRM measurement can compensate the absence of BFD.

If the BFD is supported after SCG deactivation, some proposals are that UE should report BFD occurrence to SCG via master cell group (MCG). At the same time, the L1 measurement results, beam measurement results can be reported to the network and network indicates the active transmission configuration indicator (TCI) state to perform BFR without triggering random access channel (RACH). Another proposal is to reuse SCGFailureInformation message.

For UEs for which the network (NW) deactivates secondary cell group (SCG), the serving beam(s) that was valid previously when SCG was active may easily drift due to UE movement (for example, rotation or changes in the radio environment such as blockage). Thus, the serving beam(s) may not be valid anymore when the SCG is next time activated for the UE—for instance, after 10 seconds. The behavior for BFD requires UE to count beam failure instances until beamFailureInstanceMaxCount threshold is hit, however, it may take quite long time since the BFI_COUNTER is expected to be 0 given the serving beam(s) were working when the UE had previously SCG active (and even if they wouldn't, it is expected the beamFailureDetectionTimer would have expired during inactivity of the SCG).

According to some conventional technologies, random access may always be required when BFD would not be performed during SCG inactivity. However, it seems previous serving beams could equally be valid after activating the SCG from a deactivation and RA procedure could be avoided. On the other hand, if the BFD is declared only after number of beam failure instances after the SCG has been activated from the deactivated state for the UE, this will cause additional latency for the data transmission as well as additional UE power consumption in case the serving beams are indeed not valid anymore.

In order to solve at least part of the above problems, a new solution on beam failure detection is needed. According to embodiments of the present disclosure, after a serving cell is activated from deactivated state, a terminal device monitors a beam failure on the serving beam(s) of the serving cell. If a beam failure instance indication is received within a short period after the activation, the terminal device determines that the beam failure is detected on the serving beam for the serving cell. In this way, a beam failure recovery can be quicker triggered to perform candidate beam search.

FIG. 1 illustrates a schematic diagram of a communication environment 100 in which embodiments of the present disclosure can be implemented. The communication environment 100, which is a part of a communication network, further comprises a device 110-1, a device 110-2, . . . , a device 110-N, which can be collectively referred to as "first device(s) 110." The communication environment 100 comprises a second device 120. The number N can be any suitable integer numbers.

The communication environment 100 may comprise any suitable number of devices and cells. In the communication environment 100, the first device 110 and the second device 120 can communicate data and control information to each other. In the case that the first device 110 is the terminal device and the second device 120 is the network device, a link from the second device 120 to the first device 110 is referred to as a downlink (DL), while a link from the first device 110 to the second device 120 is referred to as an uplink (UL). The second device 120 and the first device 110 are interchangeable. The first device 110 can be configured with more than one cell. Only for the purpose of illustrations, the first device 110 can be configured with a serving cell 130.

In some example embodiments, the serving cell 130 can be a secondary cell. Alternatively, the serving cell 130 can be a secondary cell group (SCG) or PSCell. The term "primary cell" used herein can refer to a master cell group (MCG) cell which is operating on the primary frequency, in which the UE either performs the initial connection establishment procedure or initiates the connection re-establishment procedure. The term "secondary cell" used herein can refer to a cell, for a UE configured with CA, providing additional radio resources on top of Special Cell (SpCell). For a UE in RRC_CONNECTED not configured with carrier aggregation (CA)/dual-connectivity (DC), there is only one serving cell comprising of the primary cell. For a UE in RRC_CONNECTED configured with CA/DC, the term "serving cells" is used to denote the set of cells comprising of the Special Cell(s) and all secondary cells. The term "PSCell" used herein can refer to a primary cell of a secondary cell group (SCG). The term "SpCell" used herein refers to a PCell or a PSCell.

It is to be understood that the number of first devices and cells and their connections shown in FIG. 1 is given for the purpose of illustration without suggesting any limitations. The communication environment 100 may include any suitable number of devices and networks adapted for implementing embodiments of the present disclosure.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
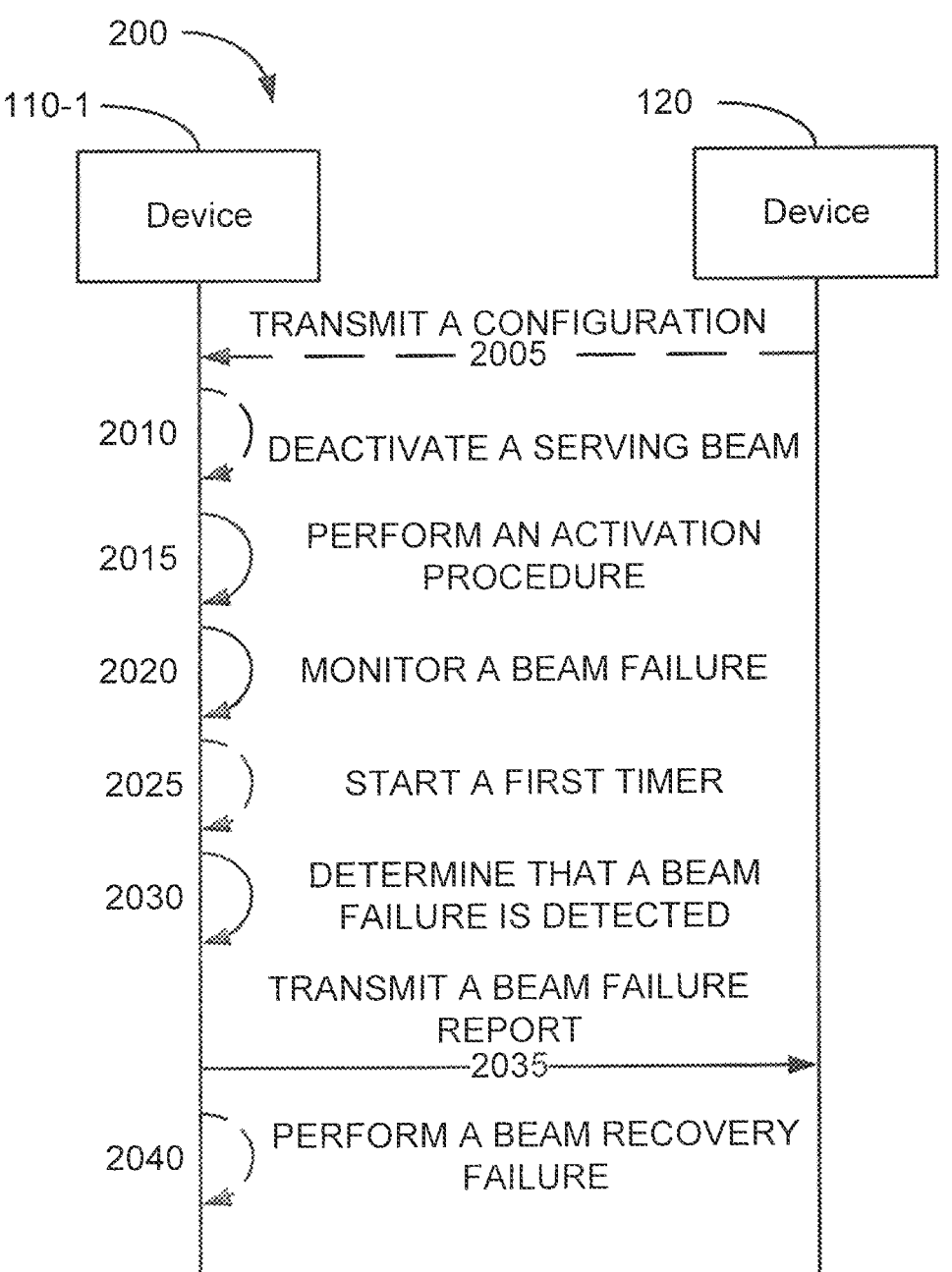
FIG. 2 illustrates a signaling flow for delivering beam information according to some example embodiments of the present disclosure.
Figure 5:
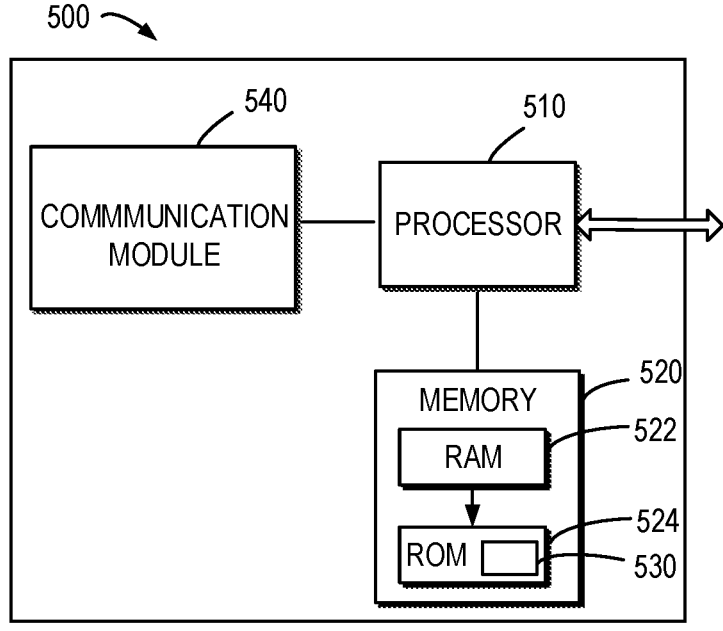
FIG. 5 illustrates a simplified block diagram of an apparatus that is suitable for implementing example embodiments of the present disclosure.

Example embodiments of the present disclosure will be described in detail below with reference to the accompanying drawings. Reference is now made to FIG. 2, which illustrates a signaling flow 200 for beam failure detection according to example embodiments of the present disclosure. For the purpose of discussion, the signaling flow 200 will be described with reference to FIG. 1. Only for the purpose of illustrations, the signaling flow 200 may involve the first device 110-1 and the second device 120.

The second device 120 may transmit 2005 a configuration to the first device 110-1. For example, the configuration may comprise a first timer for beam failure detection. The first timer may be applied after activation of a serving cell (for example, the cell 130). For example, the configuration may be an indication for a period of time within which the first timer is applicable. Only for the purpose of illustrations, the serving cell used herein can refer to the cell 130. Alternatively or in addition, the configuration can comprise a second timer for beam failure detection. The second timer can be used for normal beam failure detection. The first timer may be shorter than the second timer. In this way, a beam failure recovery can be quicker triggered.

In other embodiments, the configuration can comprise a first counter for beam failure detection. The first counter can be applied after activation of the cell 130. For example, the configuration may be an indication for a period of time within which the first counter is applicable. Alternatively or in addition, the configuration may comprise a second counter for beam failure detection. The second counter can be used for normal beam failure detection. A maximum value of the first counter can be smaller than a maximum value of the second counter. For instance, beam failure may be detected when the first counter reaches its maximum value or the second counter reaches its maximum value. The configuration can comprise any one or combinations of: the first timer, the second timer, the first counter and the second counter. The first timer, the second timer, the first counter and the second counter can be transmitted in a same configuration or different configurations. In some examples, the counters are applied by the first device 110-1 itself but the configuration comprises only the maximum values for the first and second counters.

The configuration can be transmitted via any proper signaling. For example, the configuration can be transmitted via RRC signaling. Alternatively, the configuration can be transmitted in downlink control information (DCI).

The first device 110-1 can deactivate 2010 the serving cell (i.e., the cell 130). In some example embodiments, the second device 120 may transmit a MAC CE to the first device 110-1 to deactivate the cell 130. Alternatively, the first device 110-1 may be configured with a deactivation timer by the second device 120. In this case, if no data or physical downlink control channel (PDCCH) message is received on the cell 130 within the deactivation timer, the first device 110-1 can deactivate the cell 130.

After the deactivation of the cell 130, the first device 110-1 may not transmit sounding reference signals (SRSs) on the serving cell. In addition, the first device 110-1 may not transmit channel quality indicator (CQI)/Channel State Information (CSI) report. Alternatively or additionally, the first device 110-1 may not transmit rank indication or precoding matrix indicator. The first device 110-1 may also not transmit data or receive data on the cell 130 after the deactivation.

The first device 110-1 performs 2015 an activation procedure on the cell 130. For example, the second device 120 may transmit an indication to the first device 110-1 to activate the cell 130. The indication may be a MAC CE based information or RRC signaling. After the activation of the cell 130, the first device 110-1 may transmit SRSs on the serving cell. In addition, the first device 110-1 may CQI/CSI report. Alternatively or additionally, the first device 110-1 may transmit rank indication or precoding matrix indicator. The first device 110-1 may also transmit data or receive data on the cell 130 after the deactivation.

The first device 110-1 monitors 2020 a beam failure on the serving beam(s) of the cell 130 after the activation of the cell 130. For example, the first device 110-1 may have a threshold value. If a signal received on the serving beam is below the threshold value, the first device 110-1 can determine that one beam failure instance is detected. After detecting the beam failure instance is detected, the lower layer of the first device 110-1 can transmit a beam failure instance indication to the MAC entity of the first device 110-1.

In some example embodiments, the first device 110-1 can start 2025 the first timer. For example, if a beam failure instance is detected within a predetermined duration after the activation, the first timer can be started. Alternatively or in addition, the first counter can be applied within the predetermined duration after the activation. The predetermined duration can be any suitable length.

If at least one beam failure instance indication is received within a predetermined period after the activation, the first device 110-1 determines 2030 that a beam failure is detected. For example, if a beam failure instance is detected by lower layers of the first device 110-1 (for example, Layer 1, L1), the lower layers can transmit to the MAC entity of the first device 110-1 a beam failure instance indication. In an example embodiment, if the beam failure instance is received, the first device 110-1 can determine that the beam failure is detected, regardless of the second timer or the second counter (for example, received (2005) in the configuration). In some embodiment, there may be no need for the first counter or the first timer either. In this situation, if the beam failure instance is received, the first device 110-1 can determine that the beam failure is detected.

If no beam failure instance indication is received within the predetermined period after the activation, the first device 110-1 can assume that a normal BFD procedure is applied. For example, the first device 110-1 can start the second timer if the beam failure instance indication is received after the predetermined period after activation. Alternatively or in addition, the first device 110-1 can apply the second counter.

The predetermined period can be fixed to the first device 110-1. Alternatively, the predetermined period can be configured by the second device 120. In some example embodiments, the predetermined period can be a first number of symbols. For example, if the first number of the symbols is M and the beam failure instance indication is received within M symbols after the activation, the first device 110-1 can determine that the beam failure is detected. Alternatively or in addition, the predetermined period can be a second number of milliseconds. For example, the second number can be P. In this case, if the beam failure instance indication is received within P milliseconds after the activation, the first device 110-1 can determine that the beam failure is detected. In other embodiments, the predetermined period can be a third number of slots. Only as an example, the third number can be Q. In this situation, if the beam failure instance indication is received within Q slots after the activation (for example, after the slot wherein the activation indication is command from the second device 120), the first device 110-1 can determine that the beam failure is detected. In other embodiments, the predetermined period can be determined based on an interval for bam failure instance indication. The numbers of M, P and Q can be any suitable numbers. In this way, compared with the conventional beam failure detection, a beam failure can be detected more quickly, thereby ensuring communication quality.

In some example embodiments, as discussed above, the first timer can be started. In this case, if another beam failure instance indication is received before an expiration of the first timer, the first device 110-1 can determine that the beam failure is detected. In this way, the first device 110-1 can detect the beam failure in a faster manner when compared with the conventional beam failure detection.

In other embodiments, as discussed above, the first counter can be started. In this case, if the first counter hits the maximum value of the first counter, the first device 110-1 can determine that the beam failure is detected. In this way, the first device 110-1 can detect the beam failure in a faster manner when compared with the conventional beam failure detection.

Alternatively, if a quality of the serving beam before the deactivation was below a threshold quality and the at least one beam failure instance indication is received, the first device 110-1 can determine that the beam failure is detected. The threshold quality can be configured by the second device 120. In other embodiments, the threshold quality can be fixed.

As another embodiment, if a timer for beam failure detection (for example, the second timer) was running before the deactivation and the at least one beam failure instance indication is received, the first device 110-1 can determine that the beam failure is detected. In a yet embodiment, if a counter for beam failure detection (for example, the second counter) was larger than a predetermined number before the deactivation and the at least one beam failure instance indication is received, the first device 110-1 can determine that the beam failure is detected. The predetermined number can be any suitable number which is less than the maximum value of the counter, for example, 0. The predetermined number quality can be configured by the second device 120. In other embodiments, the predetermined number quality can be fixed.

The first device 110-1 transmits 2035 a beam failure report to the second device 120. The beam failure report indicates that the serving beam for the serving cell is failed. In some example embodiments, the first device 110-1 can select a candidate beam for the cell 130. In this case, if the candidate beam is different from the serving beam, the beam failure report can indicate the candidate beam. If the candidate beam is same as the serving beam, the beam failure report may not indicate the candidate beam. Alternatively, if a quality of the candidate beam is better than a quality of the serving beam, the beam failure report can indicate the candidate beam. If the quality of the candidate beam is worse than the quality of the serving beam, the beam failure report may not indicate the candidate beam. After receiving the beam failure report, if the beam failure report does not indicate the candidate beam, the second device 120 can assume that the serving beam is still working. In this way, it avoids unnecessary beam failure recovery.

The first device 110-1 can perform 2040 a beam failure recovery procedure. In some example embodiments, the MAC entity may be configured by RRC with a beam failure recovery procedure which is used for indicating to the second device 120 of a new synchronization signal block (SSB) or channel state information-reference signal (CSI-RS) when beam failure is detected. Alternatively, if beamFailureRecoveryConfiguration is reconfigured by upper layers during an ongoing Random Access procedure for beam failure recovery, the MAC entity may stop the ongoing Random Access procedure and initiate a Random Access procedure using the new configuration.

FIG. 3 shows a flowchart of an example method 300 in accordance with some example embodiments of the present disclosure. For the purpose of discussion, the method 300 will be described from the perspective of the first device. Only for the purpose of illustrations, the method 300 is described with the reference to the first device 110-1.

The first device 110-1 may receive a configuration from the second device 120. For example, the configuration may comprise a first timer for beam failure detection. The first timer may be applied after activation of a serving cell (for example, the cell 130). For example, the configuration may be an indication for a period of time within which the first timer is applicable. Only for the purpose of illustrations, the serving cell used herein can refer to the cell 130. Alternatively or in addition, the configuration can comprise a second timer for beam failure detection. The second timer can be used for normal beam failure detection. The first timer may be shorter than the second timer. In this way, a beam failure recovery can be quicker triggered.

In other embodiments, the configuration can comprise a first counter for beam failure detection. The first counter can be applied after activation of the cell 130. For example, the configuration may be an indication for a period of time within which the first counter is applicable. Alternatively or in addition, the configuration may comprise a second counter for beam failure detection. The second counter can be used for normal beam failure detection. A maximum value of the first counter can be smaller than a maximum value of the second counter. For instance, beam failure may be detected when the first counter reaches its maximum value or the second counter reaches its maximum value. The configuration can comprise any one or combinations of: the first timer, the second timer, the first counter and the second counter. The first timer, the second timer, the first counter and the second counter can be transmitted in a same configuration or different configurations. In some examples, the counters are applied by the first device 110-1 itself but the configuration comprises only the maximum values for the first and second counters.

The configuration can be transmitted via any proper signaling. For example, the configuration can be transmitted via RRC signaling. Alternatively, the configuration can be transmitted in downlink control information (DCI).

In some example embodiments the first device 110-1 can deactivate the serving cell (i.e., the cell 130). In some example embodiments, the first device 110-1 may receive a MAC CE from the second device 120 to deactivate the cell 130. Alternatively, the first device 110-1 may be configured with a deactivation timer by the second device 120. In this case, if no data or physical downlink control channel (PDCCH) message is received on the cell 130 within the deactivation timer, the first device 110-1 can deactivate the cell 130.

After the deactivation of the cell 130, the first device 110-1 may not transmit sounding reference signals (SRSs) on the serving cell. In addition, the first device 110-1 may not transmit channel quality indicator (CQI)/Channel State Information (CSI) report. Alternatively or additionally, the first device 110-1 may not transmit rank indication or precoding matrix indicator. The first device 110-1 may also not transmit data or receive data on the cell 130 after the deactivation.

At block 310, the first device 110-1 performs an activation procedure on the cell 130. For example, the second device 120 may transmit an indication to the first device 110-1 to activate the cell 130. The indication may be a MAC CE based information or RRC signaling. After the activation of the cell 130, the first device 110-1 may transmit SRSs on the serving cell. In addition, the first device 110-1 may CQI/CSI report. Alternatively or additionally, the first device 110-1 may transmit rank indication or precoding matrix indicator. The first device 110-1 may also transmit data or receive data on the cell 130 after the deactivation.

At block 320, the first device 110-1 monitors a beam failure on the serving beam(s) of the cell 130 after the activation of the cell 130. For example, the first device 110-1 may have a threshold value. If a signal received on the serving beam is below the threshold value, the first device 110-1 can determine that one beam failure instance is detected. After detecting the beam failure instance is detected, the lower layer of the first device 110-1 can transmit a beam failure instance indication to the MAC entity of the first device 110-1.

In some example embodiments, the first device 110-1 can start the first timer. For example, if a beam failure instance is detected within a predetermined duration after the activation, the first timer can be started. Alternatively or in addition, the first counter can be applied within the predetermined duration after the activation. The predetermined duration can be any suitable length.

At block 330, if at least one beam failure instance indication is received within a predetermined period after the activation, the first device 110-1 determines that a beam failure is detected. For example, if a beam failure instance is detected by lower layers of the first device 110-1 (for example, Layer 1, L1), the lower layers can transmit to the MAC entity of the first device 110-1 a beam failure instance indication. In an example embodiment, if the beam failure instance is received, the first device 110-1 can determine that the beam failure is detected, regardless of the second timer or the second counter (for example, received in the configuration). In some embodiment, there may no need for the first counter or the first timer either. In this situation, if the beam failure instance is received, the first device 110-1 can determine that the beam failure is detected.

If no beam failure instance indication is received within the predetermined period after the activation, the first device 110-1 can assume that a norm BFD procedure is applied. For example, the first device 110-1 can start the second timer if the beam failure instance indication is received after the predetermined period after activation. Alternatively or in addition, the first device 110-1 can apply the second counter.

The predetermined period can be fixed to the first device 110-1. Alternatively, the predetermined period can be configured by the second device 120. In some example embodiments, the predetermined period can be a first number of symbols. For example, if the first number of the symbols is M and the beam failure instance indication is received within M symbols after the activation, the first device 110-1 can determine that the beam failure is detected. Alternatively or in addition, the predetermined period can be a second number of milliseconds. For example, the second number can be P. In this case, if the beam failure instance indication is received within P milliseconds after the activation, the first device 110-1 can determine that the beam failure is detected. In other embodiments, the predetermined period can be a third number of slots. Only as an example, the third number can be Q. In this situation, if the beam failure instance indication is received within Q slots after the activation (for example, after the slot wherein the activation indication is command from the second device 120), the first device 110-1 can determine that the beam failure is detected. In other embodiments, the predetermined period can be determined based on an interval for bam failure instance indication. The numbers of M, P and Q can be any suitable numbers. In this way, compared with the conventional beam failure detection, a beam failure can be detected more quickly, thereby ensuring communication quality.

In some example embodiments, as discussed above, the first timer can be started. In this case, if another beam failure instance indication is received before an expiration of the first timer, the first device 110-1 can determine that the beam failure is detected. In this way, the first device 110-1 can detect the beam failure in a faster manner when compared with the conventional beam failure detection.

In other embodiments, as discussed above, the first counter can be started. In this case, if the first counter hits the maximum value of the first counter, the first device 110-1 can determine that the beam failure is detected. In this way, the first device 110-1 can detect the beam failure in a faster manner when compared with the conventional beam failure detection.

Alternatively, if a quality of the serving beam before the deactivation was below a threshold quality and the at least one beam failure instance indication is received, the first device 110-1 can determine that the beam failure is detected. The threshold quality can be configured by the second device 120. In other embodiments, the threshold quality can be fixed.

As another embodiment, if a timer for beam failure detection (for example, the second timer) was running before the deactivation and the at least one beam failure instance indication is received, the first device 110-1 can determine that the beam failure is detected. In a yet embodiment, if a counter for beam failure detection (for example, the second counter) was larger than a predetermined number before the deactivation and the at least one beam failure instance indication is received, the first device 110-1 can determine that the beam failure is detected. The predetermined number can be any suitable number which is less than the maximum value of the counter, for example, 0. The predetermined number quality can be configured by the second device 120. In other embodiments, the predetermined number quality can be fixed.

At block 340, the first device 110-1 transmits a beam failure report to the second device 120. The beam failure report indicates that the serving beam for the serving cell is failed. In some example embodiments, the first device 110-1 can select a candidate beam for the cell 130. In this case, if the candidate beam is different from the serving beam, the beam failure report can indicate the candidate beam. If the candidate beam is same as the serving beam, the beam failure report may not indicate the candidate beam. Alternatively, if a quality of the candidate beam is better than a quality of the serving beam, the beam failure report can indicate the candidate beam. If the quality of the candidate beam is worse than the quality of the serving beam, the beam failure report may not indicate the candidate beam. After receiving the beam failure report, if the beam failure report does not indicate the candidate beam, the second device 120 can assume that the serving beam is still working. In this way, it avoids unnecessary beam failure recovery.

FIG. 4 shows a flowchart of an example method 400 in accordance with some example embodiments of the present disclosure. For the purpose of discussion, the method 400 will be described from the perspective of the second device. Only for the purpose of illustrations, the second device can be the second device 120.

In some example embodiments, at block 410, the second device 120 may transmit a configuration to the first device 110-1. For example, the configuration may comprise a first timer for beam failure detection. The first timer may be applied after activation of a serving cell (for example, the cell 130). For example, the configuration may indication a period of time within which the first timer is applicable. Only for the purpose of illustrations, the serving cell used herein can refer to the cell 130. Alternatively or in addition, the configuration can comprise a second timer for beam failure detection. The second timer can be used for normal beam failure detection. The first timer can be shorter than the second timer. In this way, a beam failure recovery can be quicker triggered.

In other embodiments, the configuration can comprise a first counter for beam failure detection. The first counter can be applied after activation of the cell 130. For example, the configuration may indication a period of time within which the first counter is applicable. Alternatively or in addition, the configuration may a second counter for beam failure detection. The second counter can be used for normal beam failure detection. A maximum value of the first counter can be smaller than a maximum value of the second counter. The configuration can comprise any one or combinations of: the first timer, the second timer, the first counter and the second counter. The first timer, the second timer, the first counter and the second counter can be transmitted in a same configuration or different configurations.

The configuration can be transmitted via any proper signaling. For example, the configuration can be transmitted via RRC signaling. Alternatively, the configuration can be transmitted in downlink control information (DCI).

In some example embodiments, the second device 120 may transmit a MAC CE to the first device 110-1 to deactivate the cell 130. Alternatively, the first device 110-1 may be configured with a deactivation timer by the second device 120. In this case, if no data or physical downlink control channel (PDCCH) message is received on the cell 130 within the deactivation timer, the first device 110-1 can deactivate the cell 130.

At block 420, if at least one beam failure instance indication on the serving beam of the cell 130 is received at the first device 110-1 within a predetermined period after the activation, the second device 120 receives a beam failure report from the first device 110-1.

The predetermined period can be fixed to the first device 110-1. Alternatively, the predetermined period can be configured by the second device 120. In some example embodiments, the predetermined period can be a first number of symbols. Alternatively or in addition, the predetermined period can be a second number of milliseconds. In other embodiments, the predetermined period can be a third number of slots. In other embodiments, the predetermined period can be determined based on an interval for bam failure instance indication. The numbers of M, P and Q can be any suitable numbers. In this way, compared with the conventional beam failure detection, a beam failure can be detected more quickly, thereby ensuring communication quality.

In some example embodiments, the first timer can be started. In this case, if another beam failure instance indication is received before an expiration of the first timer, the second device 120 can receive the beam failure report from the first device 110-1.

In other embodiments, the first counter can be started. In this case, if the first counter hits the maximum value of the first counter, the second device 120 can receive the beam failure report from the first device 110-1.

Alternatively, if a quality of the serving beam before the deactivation was below a threshold quality and the at least one beam failure instance indication is received, the second device 120 can receive the beam failure report from the first device 110-1. The threshold quality can be configured by the second device 120. In other embodiments, the threshold quality can be fixed.

As another embodiment, if a timer for beam failure detection (for example, the second timer) was running before the deactivation and the at least one beam failure instance indication is received, the second device 120 can receive the beam failure report from the first device 110-1. In a yet embodiment, if a counter for beam failure detection (for example, the second counter) was larger than a predetermined number before the deactivation and the at least one beam failure instance indication is received, the second device 120 can receive the beam failure report from the first device 110-1. The predetermined number can be any suitable number which is less than the maximum value of the counter, for example, 0. The predetermined number quality can be configured by the second device 120. In other embodiments, the predetermined number quality can be fixed.

In some example embodiments, the first device 110-1 can select a candidate beam for the cell 130. In this case, if the candidate beam is different from the serving beam, the beam failure report can indicate the candidate beam. If the candidate beam is same as the serving beam, the beam failure report may not indicate the candidate beam. Alternatively, if a quality of the candidate beam is better than a quality of the serving beam, the beam failure report can indicate the candidate beam. If the quality of the candidate beam is worse than the quality of the serving beam, the beam failure report may not indicate the candidate beam. After receiving the beam failure report, if the beam failure report does not indicate the candidate beam, the second device 120 can assume that the serving beam is still working. In this way, it avoids unnecessary beam failure recovery.

In some example embodiments, a first apparatus capable of performing any of the method 300 (for example, the first device 110) may comprise means for performing the respective operations of the method 300. The means may be implemented in any suitable form. For example, the means may be implemented in a circuitry or software module. The first apparatus may be implemented as or included in the first device 110. In some example embodiments, the means may comprise at least one processor and at least one memory including computer program code. The at least one memory and computer program code are configured to, with the at least one processor, cause performance of the apparatus.

In some example embodiments, the apparatus comprises means for performing an activation procedure on a serving cell which was deactivated; means for monitoring a beam failure on a serving beam of the serving cell after activating the serving cell; means for in accordance with a determination that at least one beam failure instance indication is received within a predetermined period, determining that the beam failure is detected on the serving beam; and means for transmitting a beam failure report to a second device.

In some example embodiments, the means for determining that the beam failure is detected on the serving beam comprises: means for in accordance with a determination that a quality of the serving beam before the deactivation was below a threshold quality and the at least one beam failure instance indication is received, determining that the beam failure is detected on the serving beam.

In some example embodiments, the means for determining that the beam failure is detected on the serving beam comprises: means for in accordance with a determination that a timer for beam failure detection was running before the deactivation and the at least one beam failure instance indication is received, determining that the beam failure is detected on the serving beam.

In some example embodiments, the means for determining that the beam failure is detected on the serving beam comprises: means for in accordance with a determination that a determination that a counter for beam failure detection was larger than a predetermined number and the at least one beam failure instance indication is received, determining that the beam failure is detected on the serving beam.

In some example embodiments, the predetermined period comprises one of: a first predetermined number of symbols, a second predetermined number of milliseconds, or a third predetermined number of slots; or wherein the apparatus comprises means for determining the predetermined period based on an interval for beam failure instance indication.

In some example embodiments, the apparatus further comprises means for receiving a configuration from the second device, the configuration indicating at least one of: a first timer for beam failure detection and a second timer for beam failure detection, the first timer being shorter than the second timer; or a first counter for beam failure detection and a second counter for beam failure detection, a maximum value of the first counter being smaller than a maximum value of the second counter.

In some example embodiments, the apparatus further comprises means for in accordance with a determination that the at least one beam failure instance indication is received within the predetermined period, starting the first timer; and wherein the means for determining that the beam failure is detected on the serving beam comprises: means for in accordance with a determination that another beam failure instance indication is received before an expiration of the first timer, determining that the beam failure is detected on the serving beam.

In some example embodiments, the apparatus further comprises means for in accordance with a determination that the at least one beam failure instance indication is received within the predetermined period, applying the first counter; and wherein the means for determining that the beam failure is detected on the serving beam comprises: means for in accordance with a determination that the first counter hit the maximum value of the first counter, determining that the beam failure is detected on the serving beam.

In some example embodiments, the apparatus further comprises means for in accordance with a determination that no beam failure instance indication is received within the predetermined period, applying at least one of: the second timer or the second counter.

In some example embodiments, the means for transmitting the beam failure report comprises: means for in accordance with a determination that a candidate beam is different from the serving beam, transmitting the beam failure report indicating the candidate beam; or means for in accordance with a determination that a quality of the candidate beam is better than a quality of the serving beam, transmitting the beam failure report indicating the candidate beam.

In some example embodiments, the means for transmitting the beam failure report comprises: means for in accordance with a determination that a candidate beam is same as the serving beam or a determination that a quality of the candidate beam is worse than a quality of the serving beam, transmitting the beam failure report without indicating the candidate beam.

In some example embodiments, the serving cell is a secondary cell or a secondary cell group.

In some example embodiments, the first device comprises a terminal device and the second device comprises a network device.

In some example embodiments, a first apparatus capable of performing any of the method 400 (for example, the second device 120) may comprise means for performing the respective operations of the method 400. The means may be implemented in any suitable form. For example, the means may be implemented in a circuitry or software module. The first apparatus may be implemented as or included in the first device 120. In some example embodiments, the means may comprise at least one processor and at least one memory including computer program code. The at least one memory and computer program code are configured to, with the at least one processor, cause performance of the apparatus.

In some example embodiments, the apparatus comprises means for in accordance with a determination that at least one beam failure instance indication on a serving beam of a serving cell is received at device first device within a predetermined period after activating the serving cell, receiving, at a second device, a beam failure report from the first device.

In some example embodiments, the means for receiving the beam failure report comprises: means for in accordance with a determination that a quality of the serving beam before the deactivation was below a threshold quality and the at least one beam failure instance indication is received, receiving the beam failure report from the first device.

In some example embodiments, the means for receiving the beam failure report comprises: means for in accordance with a determination that a timer for beam failure detection was running before the deactivation and the at least one beam failure instance indication is received, receiving the beam failure report from the first device.

In some example embodiments, the means for receiving the beam failure report comprises: means for in accordance with a determination that a determination that a counter for beam failure detection was larger than a predetermined number and the at least one beam failure instance indication is received, receiving the beam failure report from the first device.

In some example embodiments, the predetermined period comprises one of: a first predetermined number of symbols, a second predetermined number of milliseconds, a third predetermined number of slots; or an interval for beam failure instance indication.

In some example embodiments, the apparatus further comprises means for transmitting a configuration to the first device, the configuration indicating at least one of: a first timer for beam failure detection and a second timer for beam failure detection, the first timer being shorter than the second timer; or a first counter for beam failure detection and a second counter for beam failure detection, a maximum value of the first counter being smaller than a maximum value of the second counter.

In some example embodiments, the apparatus further comprises means for in accordance with a determination that the at least one beam failure instance indication is received within the predetermined period and a determination that another beam failure instance indication is received before an expiration of the first timer, receiving the beam failure report from the first device.

In some example embodiments, the apparatus further comprises means for in accordance with a determination that the at least one beam failure instance indication is received within the predetermined period and a determination that the first counter hit the maximum value of the first counter, receiving the beam failure report from the first device.

In some example embodiments, the means for receiving the beam failure report comprises: means for in accordance with a determination that a candidate beam is different from the serving beam, receiving the beam failure report indicating the candidate beam; or means for in accordance with a determination that a quality of the candidate beam is better than a quality of the serving beam, receiving the beam failure report indicating the candidate beam.

In some example embodiments, the means for receiving the beam failure report comprises: means for in accordance with a determination that a candidate beam is same as the serving beam or a determination that a quality of the candidate beam is worse than a quality of the serving beam, receiving the beam failure report without indicating the candidate beam; and means for determining that the serving beam is working.

In some example embodiments, the serving cell is a secondary cell or a secondary cell group.

In some example embodiments, the first device comprises a terminal device and the second device comprises a network device.

Figure 6:
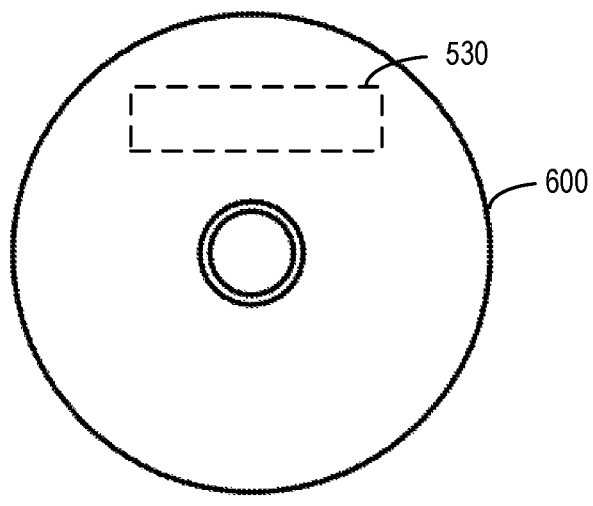
FIG. 6 illustrates a block diagram of an example computer readable medium in accordance with some example embodiments of the present disclosure.

FIG. 6 is a simplified block diagram of a device 600 that is suitable for implementing example embodiments of the present disclosure. The device 600 may be provided to implement a communication device, for example, the first device 110 or the second device 120 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has one or more communication interfaces to facilitate communication with one or more other modules or devices. The communication interfaces may represent any interface that is necessary for communication with other network elements. In some example embodiments, the communication module 640 may include at least one antenna.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 622 and other volatile memories that will not latest in the power-down duration.

A computer program 630 includes computer executable instructions that are executed by the associated processor 610. The program 630 may be stored in the memory, e.g., ROM 624. The processor 610 may perform any suitable actions and processing by loading the program 630 into the RAM 622.

Example embodiments of the present disclosure may be implemented by means of the program 630 so that the device 600 may perform any process of the disclosure as discussed with reference to FIGS. 2 to 5. The example embodiments of the present disclosure may also be implemented by hardware or by a combination of software and hardware.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and other magnetic storage and/or optical storage. FIG. 7 shows an example of the computer readable medium 700 in form of an optical storage disk. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 3 to 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus, comprising:
at least one processor; and
at least one memory storing instructions that, when executed by the at least one processor, cause the apparatus at least to:
perform an activation procedure on a serving cell which was deactivated;
monitor a beam failure on a serving beam of the serving cell after activating the serving cell;

in accordance with a determination that at least one beam failure instance indication is detected by the apparatus, determine that the beam failure is detected on the serving beam, regardless of configuration for a timer for beam failure detection or a counter for the beam failure detection; and
transmit a beam failure report to a network device.

2. The apparatus of claim 1, wherein the at least one memory stores instructions that, when executed by the at least one processor, cause the apparatus to determine that the beam failure is detected on the serving beam by:
in accordance with a determination that a quality of the serving beam before deactivation was below a threshold quality and the at least one beam failure instance indication is detected by the apparatus, determining that the beam failure is detected on the serving beam.

3. The apparatus of claim 1, wherein the at least one memory stores instructions that, when executed by the at least one processor, cause the apparatus to determine that the beam failure is detected on the serving beam by:
in accordance with a determination that a first timer for the beam failure detection was running before deactivation and the at least one beam failure instance indication is detected by the apparatus, determining that the beam failure is detected on the serving beam.

4. The apparatus of claim 1, wherein the counter for the beam failure detection is a second counter, and wherein the at least one memory stores instructions that, when executed by the at least one processor, cause the apparatus to determine that the beam failure is detected on the serving beam by:
in accordance with a determination that a determination that a first counter for the beam failure detection was larger than a predetermined number and the at least one beam failure instance indication is detected by the apparatus, determining that the beam failure is detected on the serving beam.

5. The apparatus of claim 1, wherein
the determination that the at least one beam failure instance indication is detected by the apparatus is performed within a predetermined period that comprises one of:
a first predetermined number of symbols,
a second predetermined number of milliseconds, or
a third predetermined number of slots; and
the at least one memory stores instructions that, when executed by the at least one processor, cause the apparatus to determine the predetermined period based on an interval for beam failure instance indication determination.

6. The apparatus of claim 1, wherein the timer for the beam failure detection is a second timer and the counter for the beam failure detection is a second counter, wherein the determination that the at least one beam failure instance indication is detected by the apparatus is performed within a predetermined period and wherein, and wherein the at least one memory stores instructions that, when executed by the at least one processor, further cause the apparatus to:
receive a configuration from the network device, the configuration indicating at least one of:
a first timer for the beam failure detection and the second timer for the beam failure detection, the first timer being shorter than the second timer; or
a first counter for the beam failure detection and the second counter for the beam failure detection, a maximum value of the first counter being smaller than a maximum value of the second counter.

7. The apparatus of claim 6, wherein the at least one memory stores instructions that, when executed by the at least one processor, further cause the apparatus to: in accordance with a determination that the at least one beam failure instance indication is detected by the apparatus within the predetermined period, starting the first timer; and wherein determining that the beam failure is detected on the serving beam comprises: in accordance with a determination that another beam failure instance indication is detected by the apparatus before an expiration of the first timer, determining that the beam failure is detected on the serving beam.

8. The apparatus of claim 6, wherein the at least one memory stores instructions that, when executed by the at least one processor, further cause the apparatus to: in accordance with a determination that the at least one beam failure instance indication is detected by the apparatus within the predetermined period, apply the first counter; and the at least one memory stores instructions that, when executed by the at least one processor, cause the apparatus to determine that the beam failure is detected on the serving beam by: in accordance with a determination that the first counter hit the maximum value of the first counter, determining that the beam failure is detected on the serving beam.

9. The apparatus of claim 6, wherein the at least one memory stores instructions that, when executed by the at least one processor, further cause the apparatus to: in accordance with a determination that no beam failure instance indication is detected within the predetermined period, apply at least one of: the second timer or the second counter.

10. The apparatus of claim 1, wherein the at least one memory stores instructions that, when executed by the at least one processor, cause the apparatus to transmit the beam failure report by:

in accordance with a determination that a candidate beam is different from the serving beam, transmitting the beam failure report indicating the candidate beam; or in accordance with a determination that a quality of the candidate beam is better than a quality of the serving beam, transmitting the beam failure report indicating the candidate beam.

11. The apparatus of claim 1, wherein the at least one memory stores instructions that, when executed by the at least one processor, cause the apparatus to transmit the beam failure report by: in accordance with a determination that a candidate beam is same as the serving beam or a determination that a quality of the candidate beam is worse than a quality of the serving beam, transmitting the beam failure report without indicating the candidate beam.

12. The apparatus of claim 1, wherein the serving cell is a secondary cell or a secondary cell group.

13. The apparatus of claim 1, wherein the apparatus comprises or is comprised in a terminal device.

14. A method, comprising:

performing, at a terminal device, an activation procedure on a serving cell which was deactivated;

monitoring a beam failure on a serving beam of the serving cell after activating the serving cell;

in accordance with a determination that at least one beam failure instance indication is detected by the terminal device, determining that the beam failure is detected on the serving beam, regardless of configuration for a timer for beam failure detection or a counter for the beam failure detection; and transmitting a beam failure report to a network device.

15. The method of claim 14, wherein the timer for the beam failure detection is a second timer and the counter for the beam failure detection is a second counter, and wherein determining that the beam failure is detected on the serving beam comprises at least one of:

in accordance with a determination that a quality of the serving beam before deactivation was below a threshold quality and the at least one beam failure instance indication is detected by the terminal device, determining that the beam failure is detected on the serving beam;

in accordance with a determination that a first timer for the beam failure detection was running before the deactivation and the at least one beam failure instance indication is detected by the terminal device, determining that the beam failure is detected on the serving beam; or in accordance with a determination that a determination that a first counter for the beam failure detection was larger than a predetermined number and the at least one beam failure instance indication is detected by the terminal device, determining that the beam failure is detected on the serving beam.

16. The method of claim 14, wherein the timer for the beam failure detection is a second timer and the counter for the beam failure detection is a second counter, and further comprising:

receiving a configuration from the network device, the configuration indicating at least one of: a first timer for the beam failure detection and the second timer for the beam failure detection, the first timer being shorter than the second timer; or a first counter for the beam failure detection and the second counter for the beam failure detection, a maximum value of the first counter being smaller than a maximum value of the second counter.

17. The method of claim 16:

wherein the determining that the at least one beam failure instance indication is detected by the terminal device is performed within a predetermined period;

further comprising: in accordance with a determination that the at least one beam failure instance indication is detected by the terminal device within the predetermined period, starting the first timer; and wherein determining that the beam failure is detected on the serving beam comprises: in accordance with a determination that another beam failure instance indication is detected by the terminal device before an expiration of the first timer, determining that the beam failure is detected on the serving beam.

18. The method of claim 14, wherein transmitting the beam failure report comprises:

in accordance with a determination that a candidate beam is different from the serving beam, transmitting the beam failure report indicating the candidate beam; or in accordance with a determination that a quality of the candidate beam is better than a quality of the serving beam, transmitting the beam failure report indicating the candidate beam.

19. An apparatus, comprising:

at least one processor; and at least one memory storing instructions that, when executed by the at least one processor, cause the apparatus at least to:

send, to a terminal device, configuration comprising at least one of a timer for beam failure detection or a counter for the beam failure detection; and receive a beam failure report from the terminal device, regardless of the configuration that was sent for the timer for the beam failure detection or the counter for the beam failure detection.

20. The apparatus of claim 19, wherein the timer for the beam failure detection is a second timer and the counter for the beam failure detection is a second counter, and wherein the at least one memory stores instructions that, when executed by the at least one processor, further cause the apparatus to:

transmit the configuration to the terminal device, the configuration indicating at least one of:

a first timer for the beam failure detection and the second timer for the beam failure detection, the first timer being shorter than the second timer; or a first counter for the beam failure detection and the second counter for the beam failure detection, a maximum value of the first counter being smaller than a maximum value of the second counter.

\* \* \* \* \*